UNITED STATES PATENT OFFICE.

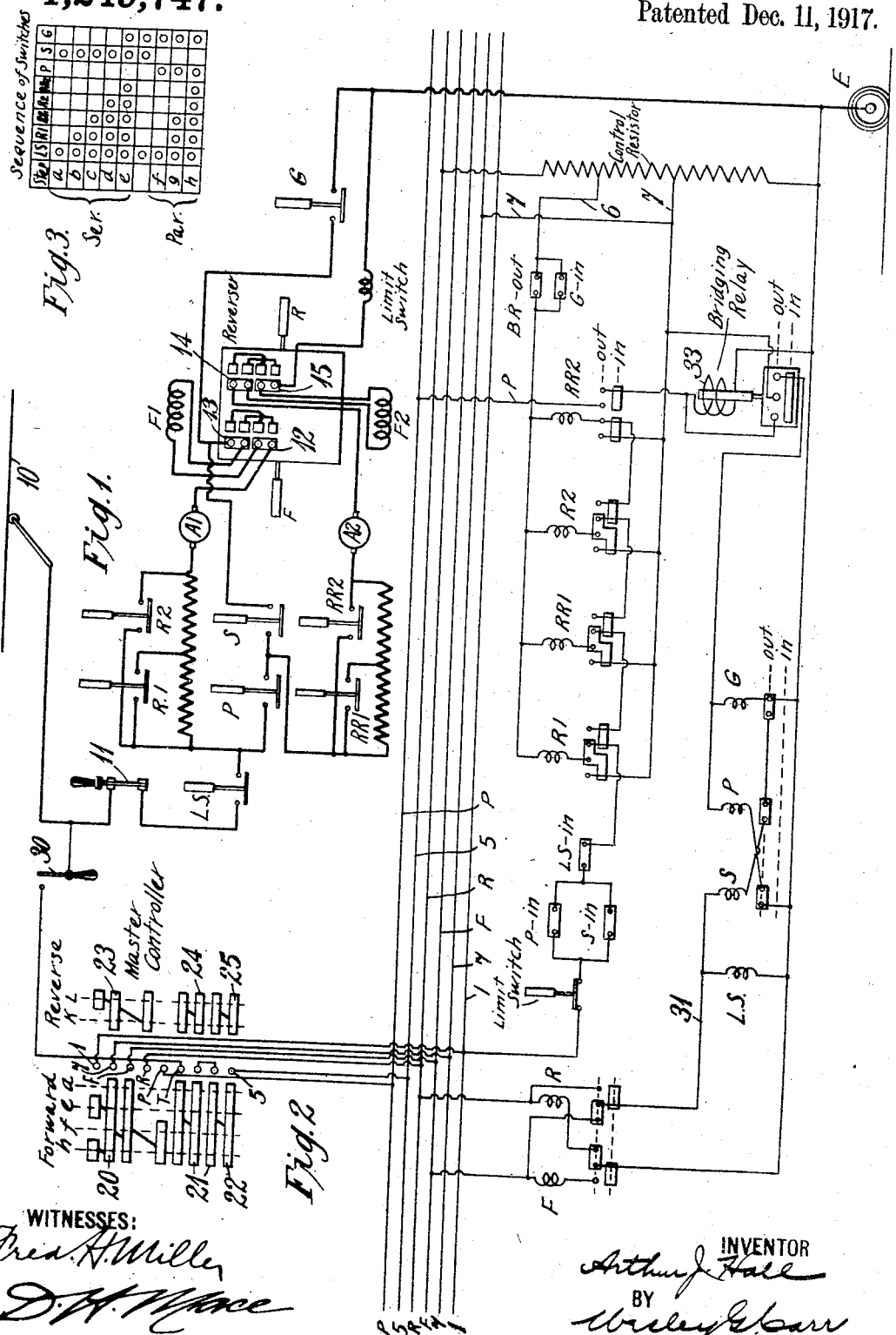

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM FOR ELECTRIC MOTORS.

1,249,747.   Specification of Letters Patent.   Patented Dec. 11, 1917.

Application filed December 4, 1913.   Serial No. 804,644.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Control Systems for Electric Motors, of which the following is a specification.

My invention relates to systems of control for electric motors, and it has special reference to systems adapted to control the operation of the electric motors of a motor car or electric locomotive operated upon a direct current railway system.

One of the objects of my invention is to provide a system of the above indicated character which shall be simple in arrangement, easy to manipulate, and adapted to automatically control the operation of the driving motors.

Another object of my invention is to provide a control system which shall have a plurality of economical running positions, and be adapted to automatically control the acceleration of the motors from rest to any one of the running positions.

Another object of my invention is to provide a series-parallel control system of the unit switch type, which may be adapted for multiple unit operation and for automatically governing a shunt transition in changing the motor connections from series to parallel arrangement.

More specifically, the object of my invention is to provide an auxiliary relay which shall act in conjunction with the usual interlock switches of a unit switch series-parallel control system for the purpose of obtaining full automatic operation of the motors while employing the well-known "shunting" method of transition.

Automatic operation of series-parallel control systems for electric railway motors has been common in the past. However, all such systems have employed what is known as "bridging" transition between series and parallel motor connections.

It is my purpose to simplify the usual connections and operation for automatically controlling electric motors, and to provide means whereby the "shunting" method of transition may be employed in a full automatic system.

In the accompanying drawing, Figure 1 is a diagrammatic view of the main motor circuits and apparatus, the auxiliary control circuits being omitted. Fig. 2 is a diagrammatic view of the auxiliary control circuits and switching devices for governing the operation and connections of the main motor circuits and apparatus, the interlock switches being distributed over the diagram without reference to the main switches with which they are associated, for the purpose of simplifying the diagram and rendering it clear and easy to understand. Fig. 3 is a chart of a type familiar to those skilled in the art, showing the positions of the several switches corresponding to the several running positions or steps of the controller. Figs. 1 and 2 are shown in the drawing in combination.

I shall first describe the main motor connections and the general operation, after which the control circuits and operation will be set forth with particular reference to the relationship between the operation of the auxiliary control apparatus and that of the main motor switches.

Referring to the drawing, the system shown comprises a supply circuit 10 which is adapted to deliver energy to a plurality of motors respectively having armatures $A^1$ and $A^2$ and field magnet windings $F^1$ and $F^2$, a plurality of resistance short-circuiting switches $R^1$, $R^2$, $RR^1$, and $RR^2$, for eliminating sections of a plurality of starting resistors, which, for convenience, will be hereinafter referred to by the same reference characters as indicate the corresponding switches, a field-changing switch marked "Reverser" for establishing connections of the field magnet windings $F^1$ and $F^2$ for forward or reverse operation, a plurality of motor circuit switches LS and S for use during the series connection of the motors, a plurality of motor circuit switches P and G which are employed during the parallel motor connections, an electro-responsive switching device marked "Limit switch" for automatically controlling the acceleration of the motors, and a return circuit E.

In the operation of the system, switches LS and S are first closed, thereby completing a circuit from the supply circuit or trolley 10 which includes a cutout switch 11, switch LS, resistors $R^1$, $R^2$, armature $A^1$, conducting segment 12 of the "reverser," field magnet winding $F^1$, conducting segment 13 of the "reverser," switch S, resistors RR¹ and RR², armature A², conducting segment 14 of the "reverser," field magnet winding F², conducting segment 15 of the "reverser," and energizing coil of the "limit switch" to the return circuit E.

Thus, energy is supplied to the driving motors through all of the starting resistors, and hence the motors are started into operation at slow speed. The resistor switches R¹, R², RR¹ and RR² are then closed successively and in accordance with the action of the "limit switches," which is dependent upon the amount of current traversing its energizing coil. Accordingly, the driving motors are gradually brought up to speed with all of the starting resistance eliminated and a series connection of the motors established.

The transition from series to parallel connections is effected by temporarily short-circuiting one of the motors in accordance with the well-known method of "shunting" transition. In accomplishing this change of connections switch G is closed simultaneously with the opening of the resistor switches, and, thus, establishes a short-circuit connection around the motor A² which temporarily renders it ineffective as a driving unit.

As soon as the G switch is closed, switch S is opened and switch P is closed. Upon closure of the switch P, parallel connections of the driving motors are established and full line voltage is applied to them and their respective starting resistors.

The operation then continues automatically to effect the progressive elimination of the starting resistors R¹, R², RR¹ and RR² and to gradually bring the motors up to their full running speed.

Before describing the operation of the auxiliary control system, attention is directed to the interlock switches which, for convenience, will be referred to as having the same reference characters as are applied to the main switches with which they are associated. Although the interlock switches referred to, are illustrated as separate from their respective main motor switches, for the sake of clearness, it should be understood that actually they are mechanically associated therewith and operate accordingly. These switches are adapted to occupy two positions, one in which the associated main switch is open and termed "switch-out" position, and the other in which the main switch is energized and closed and termed "switch-in" position.

Reference may now be had to Fig. 2 in which is shown a hand operated switching device marked "Master controller" comprising a plurality of groups of movable conducting segments 20, 21, 22 and 23, 24 and 25 and a coöperating set of stationary contact terminals 1, 7, F, R, P, T, and 5 which are adapted to engage certain of said conducting segments along the position-indicating lines $a$, $e$, $f$, and $h$ for forward operation of the motors, and to engage the other conducting segments along the position-indicating lines $k$ and $l$ for reverse operation.

A plurality of coils F and R are employed for energizing their respective cores, which are illustrated in Fig. 1 in connection with the "reverser" and which bear the same reference characters, for the purpose of moving the "reverser" to its forward or reverse position.

In order to step down the line voltage for application to the energizing coils of the several motor circuit switches, an energy-consuming device marked "Control resistor" is employed, it being provided with a plurality of intermediate taps 6 and 7.

The automatic "shunting" transition, hereinbefore mentioned, is effected by means of an auxiliary switching device marked "Bridging relay" which merely constitutes an electro-magnetically operated switch for effecting a proper transfer of circuits to give the desired operation.

Assuming the apparatus and circuit connections to be as shown, the operation of the system is as follows:

Control switch 30 is first closed, after which the "master controller" is moved to its first position marked $a$ in which a control circuit is established through contact terminal T, conducting segments 21 and 22, contact terminal and conductor 5, and the "control resistor" to the return circuit E. Energy is then delivered to contact terminal 7 of the "master controller" through tap and conductor 7 of the "control resistor", after which, a circuit is established which includes conducting segment 20, contact terminal and conductor F, interlock switch, reverser R-in and conductor 31, where the circuit divides, one branch including energizing coil of switch LS to return circuit E, and the other branch including energizing coil of switch S, interlock switch P-out, and interlock switch G-out to conductor E. Thus, switches LS and S are energized and closed to establish the series connection of the driving motors, as already explained. The motors are, therefore, started into operation.

If now, the "master controller" be moved to position $c$, a circuit from contact terminal 7 is effected which includes conducting segment 20, contact terminal and conductor 1, "limit switch" (if the motor current is not sufficient to hold it in its raised position) interlock S-in, interlock LS-in, interlock R¹-out, energizing coil of switch R¹, and interlock BR-out to tap 6 of the "control resistor."

Switch R¹ is thus closed in accordance with the action of the "limit switch", and, thereafter, switches RR¹, R² and RR² are progressively closed in an old and familiar manner which will not be described.

Thus, automatic acceleration of the motors is effected to full speed with series connection of the motors.

If now the "master controller" be moved to position f, a circuit is completed from contact terminal 7 through conducting segment 20, contact terminal P, interlock RR²-in, and energizing coil 33 of the "bridging relay" to the return circuit conductor E.

The "bridging relay" is thus raised to close its associated interlock switch which immediately establishes a holding circuit from conductor 7 through interlock BR-in and thence, through coil 33, to conductor E.

Concurrently with the actuation of the "bridging relay", its interlock BR-out, which is included in circuit with conductor 6 of the "control resistor", is opened to interrupt the energizing circuit for the switches R¹, RR¹, R², RR². These switches, therefore, open to cut in their corresponding resistors.

At the same time that the "bridging relay" establishes its holding circuit, it also completes a circuit through its interlock BR-in, and energizing coil of switch G to conductor E. Switch G is, therefore, closed to short-circuit motor A² temporarily. In closing, interlock G-out is opened which immediately deënergizes the coil of switch S and causes said switch to open. In opening switch S, interlock S-out is closed, thereby permitting energy to be supplied to the energizing coil of switch P, which switch closes in turn. Thus the driving motors are placed in parallel arrangement with their respective starting resistors in circuit therewith.

The operation from this point on, is similar to that hereinbefore described, the resistor switches R¹, RR¹, R² and RR² being closed in succession in accordance with the action of the "limit switch" until the motors are brought up to full speed with full voltage across them.

It is evident, therefore, that automatic operation, including automatic "shunting" transition, may be effected in bringing the driving motors up to their highest speed, or, the automatic operation may be arrested at either of the intermediate running positions e and f.

The function of the "bridging relay" is to transfer the control circuits during the "shunting" transition whereby the changeover of the motor connections from series to parallel may be effected without opening the motor circuit.

While I have shown and described my invention as embodying a specific arrangement of circuits and apparatus, it is to be expected that the principles involved therein may be employed with other arrangements and connections. I therefore, intend to cover in the appended claims all modifications of the system set forth which do not depart from the spirit and scope of my invention.

I claim as my invention:

1. In a system of control for electric motors, the combination with a plurality of motors, a plurality of accelerating resistors, a controller, and a plurality of motor circuit switches for arranging the motor connections for series and parallel operation and for short circuiting said resistors, of automatic electro-responsive means governed by one controller position for effecting a shunting transition and for releasing certain of said switches to insert said resistors in circuit with the parallel connected motors.

2. In a control system for electric motors, the combination with a plurality of motors, motor circuit switches for effecting changes in the motor connections, and auxiliary control circuits for controlling said switches, of means comprising a relay energized from said auxiliary circuits for governing the operation of said switches to effect automatic shunt transition.

3. In a control system for electric motors, the combination with a plurality of motors, and a plurality of motor circuit switches for arranging the connections of said motors, of means coöperating with said switches for governing the operation thereof and a relay associated therewith for automatically changing the connections of said motors from series to parallel and short-circuiting one of the motors during transition.

4. In a control system for electric motors, the combination with a plurality of motors, and a plurality of motor circuit switches for arranging the connections of said motors, of a plurality of interlocking switches associated with said motor circuit switches, and an auxiliary switch coöperating therewith for automatically changing the motor connections from series to parallel through a shunting transition.

5. In a control system for electric motors, the combination with a plurality of motors, and a plurality of motor circuit switches for arranging the connections of said motors, of a plurality of interlocking switches associated with said motor circuit switches, and an auxiliary relay switch coöperating therewith for automatically short circuiting one of the motors during the transition from series to parallel connection.

6. In a series parallel control system for electric motors, a plurality of motors, a plurality of motor circuit switches, and a plurality of resistance-governing switches, of a plurality of interlocking switches associated with certain of said resistance-governing switches and said motor circuit switches, an auxiliary relay switch dependent upon the operation of one of the aforesaid switches and coöperating therewith to effect automatic acceleration of said motors to full speed and to change said motors from series to parallel connections through a temporary short-circuit around one of said motors.

7. In a control system for electric motors, the combination with a plurality of motors, resistance-governing switches, motor circuit switches for effecting the motor connections during series operation, and motor circuit switches employed only during parallel operation, of means comprising an auxiliary relay for automatically changing said motor connections from series to parallel by a shunting transition and causing the operation of said parallel motor circuit switches.

8. In a system of control for electric motors, the combination with a plurality of motors, a controller, and a plurality of electrically-operated switches for arranging the motor connections for series and parallel operation, of automatic electro-responsive means governed by one controller position for operating certain of said switches to effect a transition in motor-circuit connections from series to parallel-circuit relation and for maintaining the motor circuit unbroken.

9. In a system of control for electric motors, the combination with a plurality of motors, a controller, a single set of resistors for effecting acceleration of the motors in series and in parallel-circuit relation, and a plurality of motor-circuit switches for arranging the motor connections for series and parallel operation, and for short circuiting said resistors, of an electro-responsive relay governed by one controller position and coöperating with one of said motor-circuit switches for effecting an automatic transition of the motor circuits from series to parallel operation and for maintaining the motor circuit unbroken.

10. In a system of control for electric motors, the combination with a plurality of motors, and a plurality of motor-circuit switches for arranging the motor connections for series and parallel operation, of an interlocking switch associated with one of said motor-circuit switches and an auxiliary relay in circuit with said interlocking switch for coöperating therewith to effect an automatic operation of said motors during the transition from series to parallel operation of the motors.

11. In a control system for electric motors, the combination with a plurality of motors, resistance-governing switches, motor-circuit switches for effecting the motor connections during series operation, and motor-circuit switches employed only during parallel operation, of electro-responsive means coöperating with one of said resistance-governing switches, motor-circuit series switches and motor-circuit parallel switches for automatically changing said motor connections from series to parallel through a shunting transition.

12. In a system of control, the combination with a plurality of motors, a controller, and means governed by said controller for operating the motors in series and in parallel-circuit relation, of automatic means governed by said controller, when moved to a transition position, for effecting a shunting transition of the motors.

13. In a system of control, the combination with a plurality of motors, a controller, and means governed by the controller for operating said motors in series and in parallel-circuit relation, of automatic electro-responsive means governed by one controller position for effecting a transition of the motor-circuit connections from series to parallel-circuit relation and for maintaining the motor circuit unbroken.

14. In a system of control, the combination with a plurality of motors, a plurality of motor-circuit switches for arranging the motor connections for series and parallel operation, and a controller for governing the operation of said motor-circuit switches, of automatic electro-responsive means governed by one controller position for effecting a transition in motor-circuit connections from series to parallel-circuit relation and for maintaining the motor circuit unbroken.

In testimony whereof, I have hereunto subscribed my name this 28th day of Nov., 1913.

ARTHUR J. HALL.

Witnesses:
 PH MARDIS,
 B. B. HINES.

Copies of this patent may be obtained for five cents each, by addressing the "Commissioner of Patents, Washington, D. C."